United States Patent
Liu et al.

(10) Patent No.: US 9,191,439 B2
(45) Date of Patent: Nov. 17, 2015

(54) METHOD AND SYSTEM FOR DATA SYNCHRONIZATION IN CONTENT DELIVERY NETWORK

(75) Inventors: Hao Liu, Shenzhen (CN); Yu Liu, Shenzhen (CN); Jianchun Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 820 days.

(21) Appl. No.: 13/393,902

(22) PCT Filed: Sep. 1, 2010

(86) PCT No.: PCT/CN2010/076529
§ 371 (c)(1),
(2), (4) Date: Mar. 2, 2012

(87) PCT Pub. No.: WO2011/026430
PCT Pub. Date: Mar. 10, 2011

(65) Prior Publication Data
US 2012/0166391 A1 Jun. 28, 2012

(30) Foreign Application Priority Data
Sep. 2, 2009 (CN) .......................... 2009 1 0168945

(51) Int. Cl.
*G06F 17/00* (2006.01)
*G06F 7/00* (2006.01)
(Continued)

(52) U.S. Cl.
CPC ........ *H04L 67/1095* (2013.01); *H04L 65/4076* (2013.01)

(58) Field of Classification Search
CPC .................................................. G06F 21/552

USPC ......................................................... 707/622
See application file for complete search history.

(56) References Cited

U.S. PATENT DOCUMENTS 6,202,085 B1 * 3/2001 Benson et al. ................ 709/205
6,222,832 B1 * 4/2001 Proctor ......................... 370/335
(Continued)

FOREIGN PATENT DOCUMENTS

CN 101242356 A 8/2008
CN 101378494 A 3/2009
(Continued)

OTHER PUBLICATIONS

International Search Report for PCT/CN2010/076529 dated Nov. 20, 2010.

*Primary Examiner* — Pavan Mamillapalli
(74) *Attorney, Agent, or Firm* — Ling Wu; Stephen Yang; Ling and Yang Intellectual Property

(57) ABSTRACT

The invention provides discloses a method for data synchronization in a content delivery network. The method includes: a data synchronization client requesting a data synchronization processing manager for obtaining a belonged data synchronization processing agent, establishing a heartbeat connection with the belonged synchronization processing agent to acquire operation status of the belonged data synchronization processing agent; and the data synchronization processing manager scanning a management side database, and if a synchronization task needing to be informed to the data synchronization client is scanned in the management side database, the data synchronization processing manager generating the synchronization task for the corresponding synchronization processing agent in an ability side database. The present invention also provides a system for data synchronization in a content delivery network, a data synchronization processing agent and a data synchronization processing manager.

18 Claims, 5 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 7,697,982 B2 * | 4/2010 | Brodnick | 607/5 |
| 7,996,566 B1 * | 8/2011 | Sylvain et al. | 709/248 |
| 8,332,501 B2 * | 12/2012 | Sharma et al. | 709/223 |
| 8,488,960 B2 * | 7/2013 | DeCusatis et al. | 398/25 |
| 2002/0131423 A1 * | 9/2002 | Chan et al. | 370/400 |
| 2005/0108187 A1 * | 5/2005 | Fujibayashi | 707/1 |
| 2007/0150480 A1 * | 6/2007 | Hwang et al. | 707/10 |
| 2007/0255150 A1 * | 11/2007 | Brodnick | 600/509 |
| 2008/0097998 A1 * | 4/2008 | Herbach | 707/9 |
| 2009/0125571 A1 * | 5/2009 | Kiilerich et al. | 707/204 |
| 2009/0141635 A1 * | 6/2009 | Little | 370/236.1 |
| 2009/0205008 A1 * | 8/2009 | Wollmershauser et al. | 725/131 |
| 2010/0131633 A1 * | 5/2010 | Herlein et al. | 709/223 |
| 2010/0235488 A1 * | 9/2010 | Sharma et al. | 709/223 |
| 2011/0038633 A1 * | 2/2011 | DeCusatis et al. | 398/79 |

FOREIGN PATENT DOCUMENTS

| | | |
|---|---|---|
| CN | 101459836 A | 6/2009 |
| CN | 101635728 A | 1/2010 |
| KR | 20040073630 A | 8/2004 |

* cited by examiner

METHOD AND SYSTEM FOR DATA SYNCHRONIZATION IN CONTENT DELIVERY NETWORK

TECHNICAL FIELD

The present invention relates to the data synchronization technology in a Content Delivery Network (CDN), and in particular, to a method and system for active synchronization of a distributed serving terminal in a CDN.

BACKGROUND ART

In the field of communication technology, Internet Protocol TV (or Interactive Personal TV, abbr. IPTV), also called as an interactive network TV, is a multi-media communication technology based on the Internet. IPTV uses the basic facilities of a broadband network, uses the domestic TV set or computer as the main terminal device, delivers TV signals through the Internet Protocol (IP), and provides various interactive digital media services including TV for family users.

CDN is a new kind of network architecture, in which the content of the service is distributed to the network "border" that is closest to the user to enable the user to acquire the desired content nearby, thus increasing the operation efficiency of the system. Technically CDN can thoroughly solve the congestion problem of the backbone network caused by huge visit capacity of users and uneven distribution of servers, and meanwhile can increase the rate of accessing a streaming media server by the user and shorten the time for responding to the service request of the user.

In order to ensure the consistence of the content data distributed in different places, the CDN needs to perform synchronization processing on different places after the content data are updated. In the CDN, there is a data synchronization processing manager application module, which is disposed on the service processor of the CDN and is used to execute the task issued by the management side of the IPTV system and to distribute a servable synchronization processing agent to a data synchronization client, and the like. The data synchronization processing agent separated from the service processor is a physical device used to share part of the functions of the service processor, and mainly executes operations such as keeping the heartbeat relationship with the data synchronization client, and performing data synchronization processing with the data synchronization client.

At present, in the content delivery network of an IPTV system, although the data synchronization processing manager and the data synchronization processing agent have been deployed in a distribution mode, however, since only the data synchronization processing manager can obtain the tasks from the management side, data transmission for synchronization initiated by the data synchronization serving side (including the synchronization processing manager and the synchronization processing agent) actively to the data synchronization client still has to be performed only on the data synchronization processing manager.

With the increase of service volume, the number of data synchronization client devices and the data volume of the synchronized messages required by the data synchronization client devices also increase correspondingly, thus causing the original system architecture where all active interfaces can only be triggered by the data synchronization manager performing data synchronization to confront a performance crisis.

SUMMARY OF THE INVENTION

The technical problem to be solved in the present invention is to provide a system and method for data synchronization in a content delivery network so as to balance the system pressure during the active synchronization process of a distributed serving terminal of a content delivery network and thereby improve the working stability of the system.

In order to solve the above technical problem, the present invention provides a method for data synchronization in a content delivery network, comprising the following steps of:

a data synchronization client requesting a data synchronization processing manager for obtaining a belonged data synchronization processing agent, establishing a heartbeat connection with the belonged synchronization processing agent to acquire operation status of the belonged data synchronization processing agent;

the data synchronization processing manager scanning a management side database, and if a synchronization task needing to be informed to the data synchronization client is scanned in the management side database, the data synchronization processing manager generating the synchronization task for the corresponding synchronization processing agent in an ability side database.

The step of the data synchronization processing manager generating the synchronization task for the corresponding synchronization processing agent in an ability side database if a synchronization task needing to be informed to the data synchronization client is scanned in the management side database comprises:

if a synchronization task needing to be informed to all data synchronization clients is scanned, generating the synchronization task for each data synchronization processing agent in the ability side database;

if a synchronization task needing to be informed to particular data synchronization clients is scanned, and synchronization processing agents to which these data synchronization clients belong are queried out, generating the synchronization task for the queried data synchronization processing agent in the ability side database.

The synchronization task in the management side database is generated at the meantime of writing service data for update being into the management side database when a management side management platform needs to update data.

After the step of generating the synchronization task for the corresponding synchronization processing agent in the ability side database, the method further comprises:

the data synchronization processing agent scanning the ability side database, and if it is scanned that there is a synchronization task needing to be executed and service data thereof for the update, locally storing the service data for the update, and meanwhile actively sending a synchronization data notification to the served data synchronization client.

After the step of actively sending a synchronization data notification to the served data synchronization client, the method further comprises:

after receiving the synchronization data notification sent by the data synchronization processing agent, the data synchronization client sending a data synchronization request to the data synchronization processing agent; receiving and storing the service data for the update in this synchronization task through a data synchronization response returned by the data synchronization processing agent.

In order to solve the above technical problem, the present invention provides a system for data synchronization in a content delivery network, comprising: a management side database, a data synchronization processing manager, an ability side database, a data synchronization processing agent and a data synchronization client, wherein, the management side database is configured to generate and store a synchronization task and service data thereof for update;

the data synchronization client is configured to request to obtain a belonged data synchronization processing agent from the data synchronization processing manager and establish a heartbeat connection with the belonged synchronization processing agent to acquire operation status of the belonged data synchronization processing agent;

the data synchronization processing manager is configured to distribute the belonged data synchronization processing agent to the data synchronization client according to a request of the data synchronization client; scan the management side database, and if a synchronization task needing to be informed to the data synchronization client is scanned in the management side database, generate the synchronization task for the corresponding data synchronization processing agent in an ability side database;

the ability side database is configured to store the synchronization task and the service data thereof to update. The data synchronization processing manager is configured to generate the synchronization task for the corresponding data synchronization processing agent in the ability side database in the following way:

if a synchronization task needing to be informed to all data synchronization clients is scanned in the management side database, generating the synchronization task for each data synchronization processing agent in the ability side database;

if a synchronization task needing to be informed to particular data synchronization clients is scanned in the management side database and a data synchronization processing agent to which these data synchronization clients belong is queried out, generating the synchronization task for the queried data synchronization processing agent in the ability side database.

The synchronization task in the management side database is generated and stored at the meantime of service data for update being written in when a management side management platform needs to update data.

The data synchronization processing agent is further configured to scan the ability side database, and if it is scanned that there is a synchronization task needing to be executed and service data thereof for update, locally store the service data for update, and meanwhile actively send a synchronization data notification to the served data synchronization client.

The data synchronization client is further configured to, after receiving the synchronization data notification sent by the data synchronization processing agent, send a data synchronization request to the data synchronization processing agent, receive and store the service data for update in this synchronization task through a data synchronization response returned by the data synchronization processing agent.

In order to solve the above technical problem, the present invention provides a data synchronization processing manager, comprising:

a distributing module, which is configured to receive a request for obtaining a belonged data synchronization processing agent transmitted by a data synchronization client, and distribute the belonged data synchronization processing agent to the data synchronization client according to the request for obtaining a belonged data synchronization processing agent;

a scanning module, which is configured to scan a management side database that generates and stores a synchronization task and service data thereof for update, and if it is scanted that there is a synchronization task needing to be informed to the data synchronization client, trigger a synchronization task generating module; and the synchronization task generating module, which is configured to, if it is scanned that there is a synchronization task needing to be informed to the data synchronization client, generate the synchronization task for the corresponding synchronization processing agent in an ability side database storing the synchronization task and service data thereof for update.

The synchronization task generating module is configured to generate the synchronization task for the corresponding synchronization processing agent in the ability side database in the following way:

if a synchronization task needing to be informed to all data synchronization clients is scanned in the management side database, generating the synchronization task for each data synchronization processing agent in the ability side database;

if a synchronization task needing to be informed to particular data synchronization clients is scanned in the management side database and a synchronization processing agent to which these data synchronization clients belong is queried out, generating the synchronization task for the queried data synchronization processing agent in the ability side database.

In order to solve the above technical problem, the present invention provides a data synchronization processing agent, comprising:

a connection establishing module, which is configured to, when a data synchronization processing manager distributes, according to a request of a data synchronization client, the data synchronization processing agent to be the data synchronization processing agent to which the data synchronization client belongs, establish a heartbeat connection with the data synchronization client belonging to the data synchronization processing agent so that the data synchronization client acquires operation status of the data synchronization processing agent;

a scanning module, which is configured to scan an ability side database, and if it is scanned that there is a synchronization task needing to be executed and service data thereof for update, trigger a transmitting module; wherein, when the ability side database stores a synchronization task generated for the corresponding data synchronization client by the data synchronization processing manager in the ability side database when the data synchronization processing manager scans that there is a synchronization task needing to be informed to the data synchronization client in the management side database; and the transmitting module, which is configured to, if it is scanned that there is a synchronization task needing to be executed and service data thereof for update, locally store the service data for update, and meanwhile actively send a synchronization data notification to the served data synchronization client.

The data synchronization processing agent further comprises:

a receiving module, which is configured to receive a data synchronization request sent to the data synchronization processing agent by the data synchronization client after the data synchronization client receives the synchronization data notification;

the transmitting module is further configured to return a data synchronization response carrying the service data for update in this synchronization task to the data synchronization client.

By implementing data synchronization processing through coordination between a data synchronization processing agent and a data synchronization processing manager, the present invention reduces the excessive burden of the data synchronization processing manager in the past and balances system pressure, thus improving system performance.

PREFERRED EMBODIMENTS OF THE INVENTION

The technical scheme of the present invention will be described in detail below with reference to the drawings and preferred examples. The examples listed below are only used to describe and explain the present invention, rather than to limit the technical scheme of the present invention.

Figure 1:
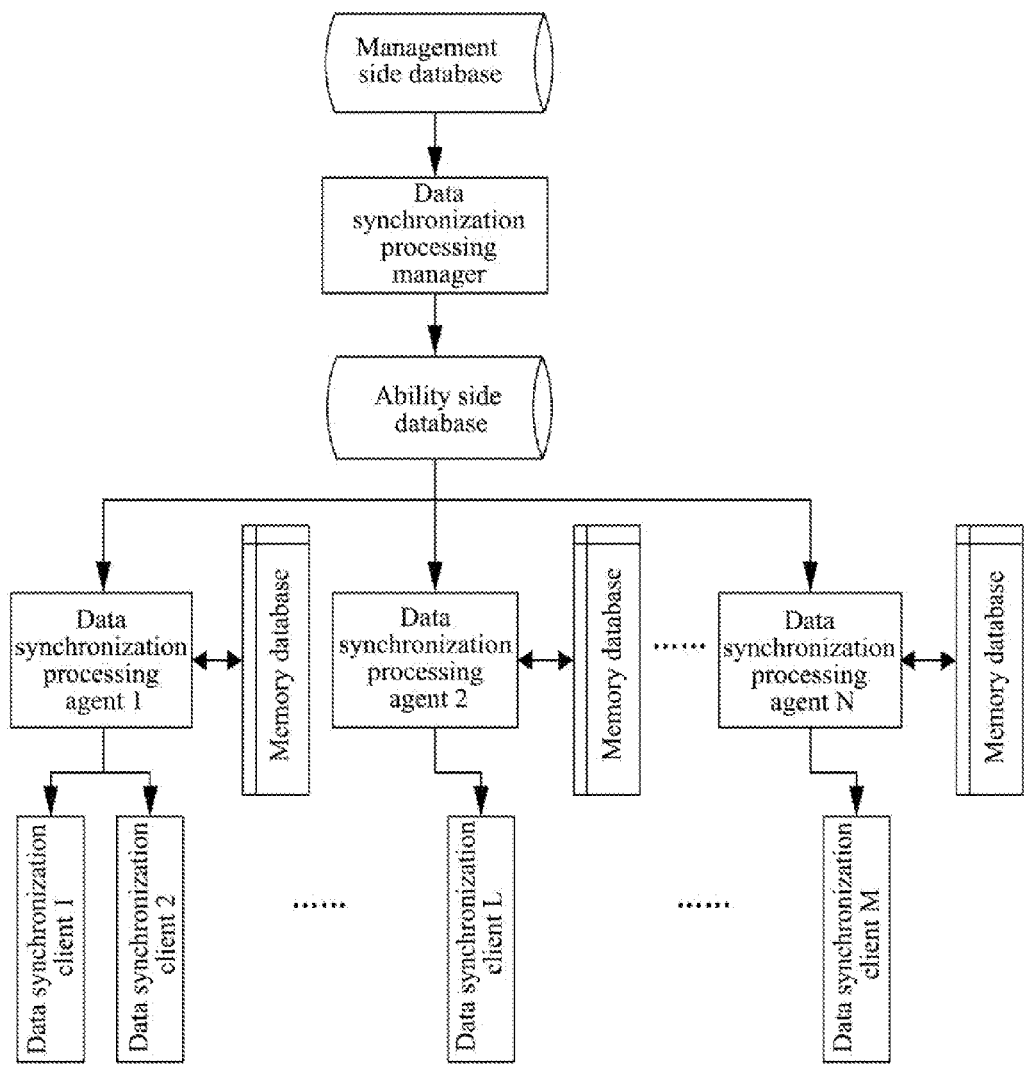
FIG. 1 is a frame structure diagram of an example of a system for data synchronization processing in a content delivery network in an IPTV system according to the present invention.

FIG. 1 is a frame structure of a system for data synchronization processing in a content delivery network according to the present invention by taking an IPTV system as an example, wherein the structure mainly includes a data synchronization processing manager and a plurality of data synchronization processing agents, as well as a plurality of data synchronization clients belonging to each data synchronization processing agent; wherein, the data synchronization processing manager is configured to distribute a servable synchronization processing agent to a data synchronization client; if it is scanned that the management side database has a synchronization task, generate the synchronization task for each synchronization processing agent in an ability side database, or generate the synchronization task for the synchronization processing agent corresponding the data synchronization client requesting data synchronization;

when the data synchronization client requests for the data synchronization processing agent, the data synchronization processing manager distributes a data synchronization processing agent to the data synchronization client according to a load balance policy, and meanwhile updates the number of data synchronization clients connected to the data synchronization processing agent.

The data synchronization processing agent is configured to, when it is scanned that there is a synchronization task for the served data synchronization client in the ability side database, store the captured synchronized data in its memory database, and inform the data synchronization client; when receiving a data synchronization request of the data synchronization client, return the synchronized data captured in the memory database to the data synchronization client;

the data synchronization client is configured to request the data synchronization processing manager for a data synchronization processing agent, and establish a heartbeat connection with the distributed synchronization processing agent; after receiving the data synchronization notification sent by the data synchronization processing agent, send a data synchronization request to the data synchronization processing agent, and obtain corresponding synchronized data through a data synchronization response returned by the data synchronization processing agent.

The present invention further provides a data synchronization processing manager, comprising:

a distributing module, which is configured to receive a request for obtaining a belonged data synchronization processing agent that is transmitted by a data synchronization client, and distribute the belonged data synchronization processing agent to the data synchronization client according to the request for obtaining a belonged data synchronization processing agent;

a scanning module, which is configured to scan a management side database that generates and stores a synchronization task and service data thereof for update, and if it is scanned that there is a synchronization task needing to be informed to the data synchronization client, trigger a synchronization task generating module; and the synchronization task generating module, which is configured to, if it is scanned that there is a synchronization task needing to be informed to the data synchronization client, generate the synchronization task for the corresponding data synchronization processing agent in an ability side database storing the synchronization task and service data thereof for update.

The synchronization task generating module is configured to generate the synchronization task for the corresponding data synchronization processing agent in the ability side database in the following way:

if a synchronization task needing to be informed to all data synchronization clients is scanned, generating the synchronization task for each data synchronization processing agent in the ability side database;

if a synchronization task needing to be informed to particular data synchronization clients is scanned, and synchronization processing agents to which these data synchronization clients belong are queried out, generating the synchronization task for the queried data synchronization processing agent in the ability side database.

This example further provides a data synchronization processing agent, comprising:

a connection establishing module, which is configured to, when a data synchronization processing manager distributes, according to a request of a data synchronization client, the data synchronization processing agent to be the data synchronization processing agent to which the data synchronization client belongs, establish a heartbeat connection with the data synchronization client belonging to the data synchronization processing agent so that the data synchronization client acquires operation status of the data synchronization processing agent;

a scanning module, which is configured to scan an ability side database, and if it is scanned that there is a synchronization task needing to be executed and service data thereof for update, trigger a transmitting module; wherein, when the ability side database stores a synchronization task generated for the corresponding data synchronization client by the data synchronization processing manager in the ability side database when the data synchronization processing manager scans that there is a synchronization task needing to be informed to the data synchronization client in the management side database; and the transmitting module, which is configured to, if it is scanned that there is a synchronization task needing to be executed and service data thereof for update, locally store the service data for update, and meanwhile actively send a synchronization data notification to the served data synchronization client.

The data synchronization processing agent further comprises:

a receiving module, which is configured to receive a data synchronization request sent to the data synchronization processing agent by the data synchronization client after the data synchronization client receives the synchronization data notification;

the transmitting module is further configured to return a data synchronization response carrying the service data for update in this synchronization task to the data synchronization client.

Figure 2:
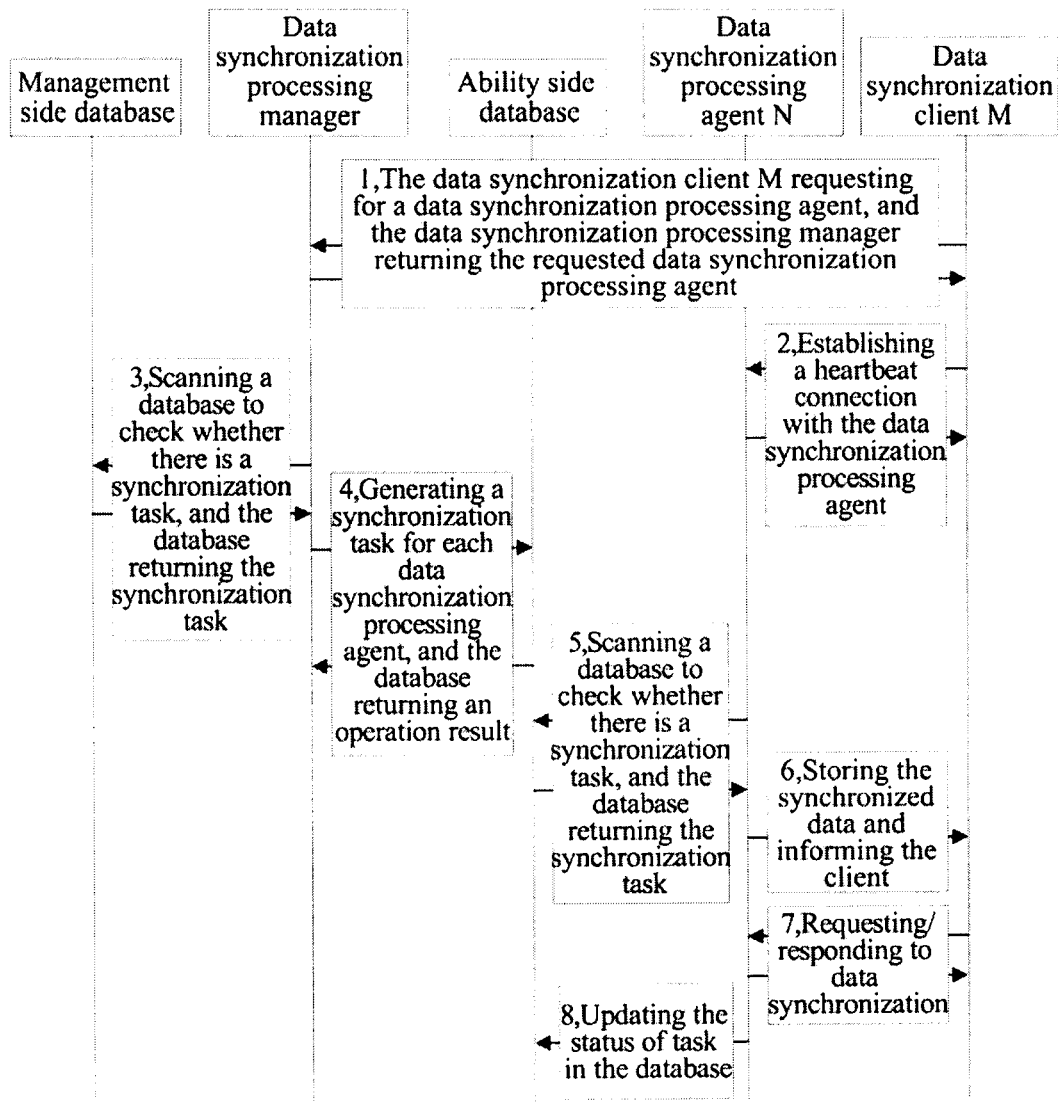
FIG. 2 is a flow sequence chart of an example of a method for data synchronization processing in a content delivery network in an IPTV system according to the present invention.

As shown in FIG. 2, the present invention provides a flow of the method for data synchronization in a content delivery network by taking an IPTV system as an example, wherein the flow comprises the following steps.

Step 1, a data synchronization client requests a data synchronization processing manager for a data synchronization processing agent, and obtains its belonged synchronization processing agent returned by the data synchronization processing manager;

the time for the data synchronization client to request for the data synchronization processing agent is: when the present device is started, when the period of service obtaining request arrives, or abnormality of the current service processing agent is detected.

Step 2, the data synchronization client establishes a heartbeat connection with the belonged synchronization processing agent in order to know whether the serving data synchronization processing agent is in normal operation status.

Steps 3 and 4, the data synchronization processing manager scans a management side database and checks whether there is a synchronization task to be executed, and if yes (i.e., the management side database returns the synchronization task to be executed) and it is required to inform all data synchronization clients, the data synchronization processing manager generates (i.e., inserts) a corresponding task for each data synchronization processing agent in an ability side database, and obtains an operation result returned by the ability side database;

when the management side managing platform needs to update data, the management side managing platform writes the service data for update into the management side database and meanwhile inserts a corresponding synchronization task into a task table in the management side database.

In another example, if the data synchronization processing manager detects that there is a synchronization task only for particular data synchronization clients and queries out the data synchronization processing agents to which these data synchronization clients belong, the data synchronization processing manager generates a corresponding synchronization task for each of these data synchronization processing agents in the ability side database and obtains an operation result returned by the ability side database.

Steps 5 and 6, the data synchronization processing agent periodically scans the ability side database to detect whether there is a synchronization task needing to be executed, and if yes (i.e., the ability side database returns the synchronization task needing to be executed), the data synchronization processing agent locally stores the data to update in a local memory database, and meanwhile actively sends a data synchronization notification to the served data synchronization client (for example, an Electronic Program Guide (EPG) service device);

the data synchronization processing agent queries the ability side database according to the parameters such as the task identity, type of task and the client identity needing to perform data synchronization of the data synchronization task captured in the ability side database, stores the data to be synchronized in the memory database, and then actively sends the data synchronization notification of this type of task to the client needing to perform data synchronization.

Step 7, after receiving the synchronization data notification sent by the data synchronization processing agent, the data synchronization client sends a data synchronization request to the corresponding data synchronization processing agent, and the data synchronization processing agent returns the service data for update in this synchronization task to the data synchronization client through a data synchronization response;

after receiving the data synchronization notification, the data synchronization client invokes a corresponding interface to send the data synchronization request of this type of task to the data synchronization processing agent according to the type of received message in the next idle period.

After receiving the data synchronization request, the data synchronization processing agent analyzes the data needing data synchronization in the memory database according to the type of task in the request, and sends to the data synchronization client.

Step 8, the data synchronization processing agent updates the status of this task in the database to be "synchronization successful".

Figure 3:
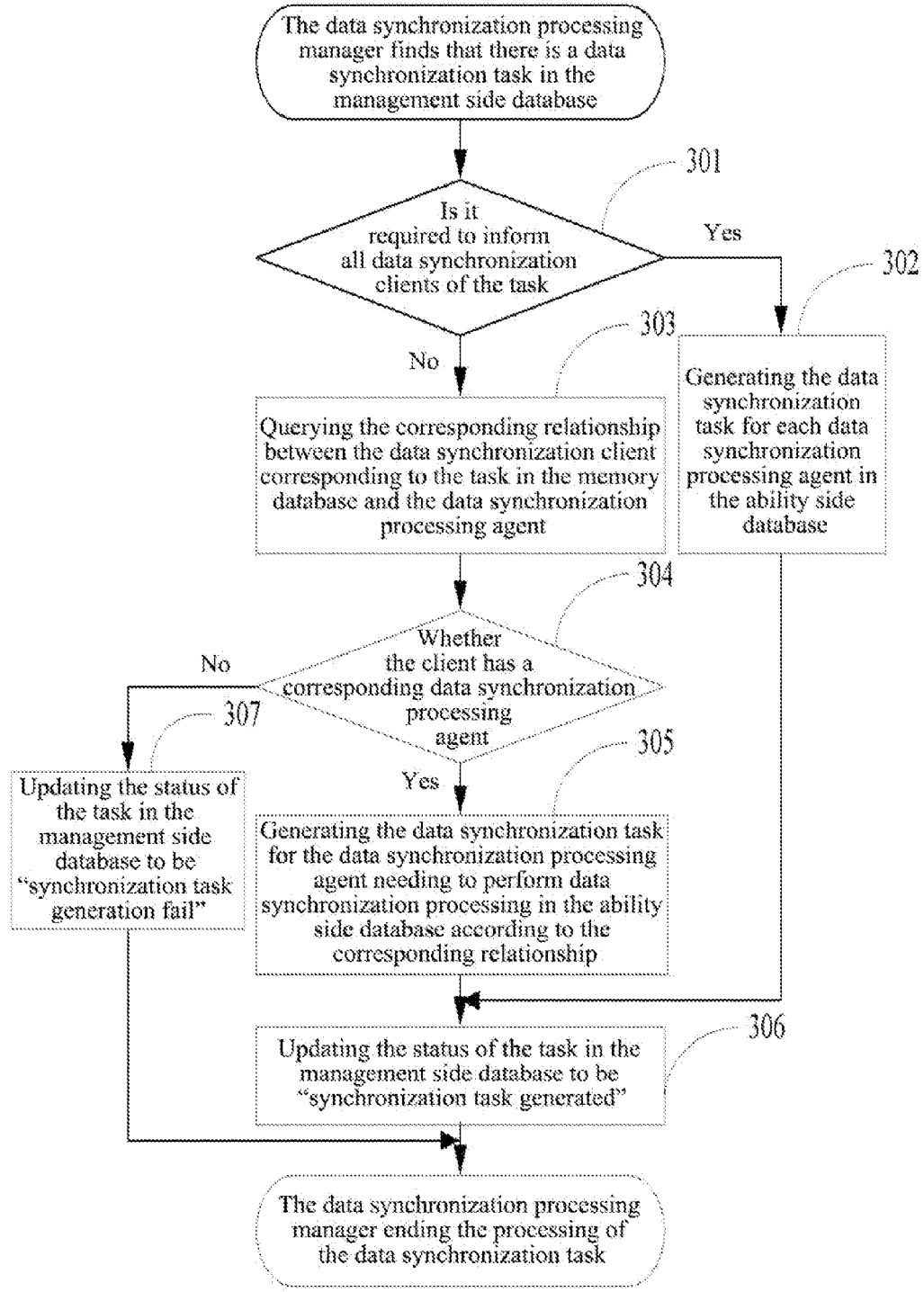
FIG. 3 is a flowchart of a data synchronization processing manager generating a data synchronization task for a data synchronization client in the method example of the present invention.

FIG. 3 is a procedure of a method of a data synchronization processing manager generating a data synchronization task for a data synchronization client in the above method example of the present invention, wherein, the procedure is implemented after a data synchronization task is queried out in the management side database, and the procedure comprises the following steps:

301, judging whether it is required that the queried task should be informed to all data synchronization clients, if yes, executing step 302, otherwise executing step 303;

302, generating the data synchronization task for each data synchronization processing agent in the ability side database, and executing step 306;

303, querying the corresponding relationship between the data synchronization client corresponding to the task in the memory database and the data synchronization processing agent;

304, determining whether the client has a corresponding data synchronization processing agent, if yes, executing step 305, otherwise executing step 307;

305, generating the data synchronization task for the data synchronization processing agent needing to perform data synchronization processing in the ability side database according to the corresponding relationship;

306, updating the status of the task in the management side database to be "synchronization task generated", and ending the flow;

307, updating the status of the task in the management side database to be "synchronization task generation fail", and ending the flow.

Figure 4:
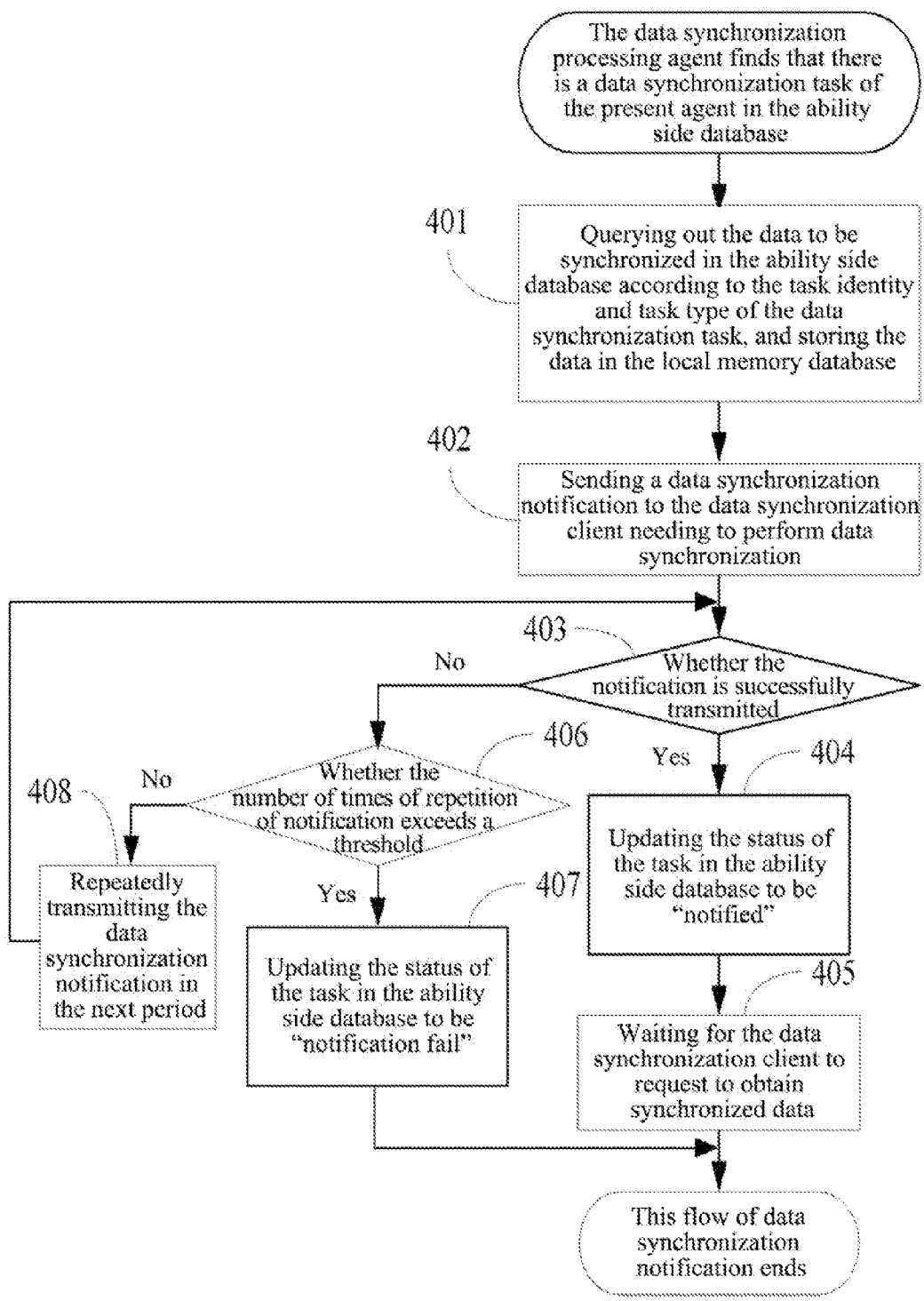
FIG. 4 is a flowchart of a data synchronization processing agent notifying a data synchronization client to perform data synchronization in the method example of the present invention.

FIG. 4 is a procedure of a data synchronization processing agent notifying a data synchronization client to perform data synchronization in the above method example of the present invention, wherein, the procedure is implemented after a data synchronization task of the present agent is queried out in the ability side database, and the procedure comprises the following steps:

401, querying the data to be synchronized in the ability side database according to the task identity and task type of the data synchronization task, and storing them in the local memory database;

402, sending a data synchronization notification to the data synchronization client needing to perform data synchronization;

403, judging whether the notification is successfully transmitted, if yes, executing step 404, otherwise executing step 406;

wherein, it is judged that the notification is successfully transmitted if the data synchronization processing agent receives a response of the data synchronization client after a period of time delay; if no response is received, it is judged that the transmission of the notification fails;

404, updating the status of the task in the ability side database to be "notified";

405, waiting for the data synchronization client to request to obtain synchronized data, and ending the flow;

406, judging whether the number of times of repetition of notification exceeds a threshold, if yes, executing step 407, otherwise, executing step 408;

407, updating the status of the task in the ability side database to be "notification fail", and ending the flow;

408, repeatedly transmitting the data synchronization notification in the next period, and returning to step 403.

Figure 5:
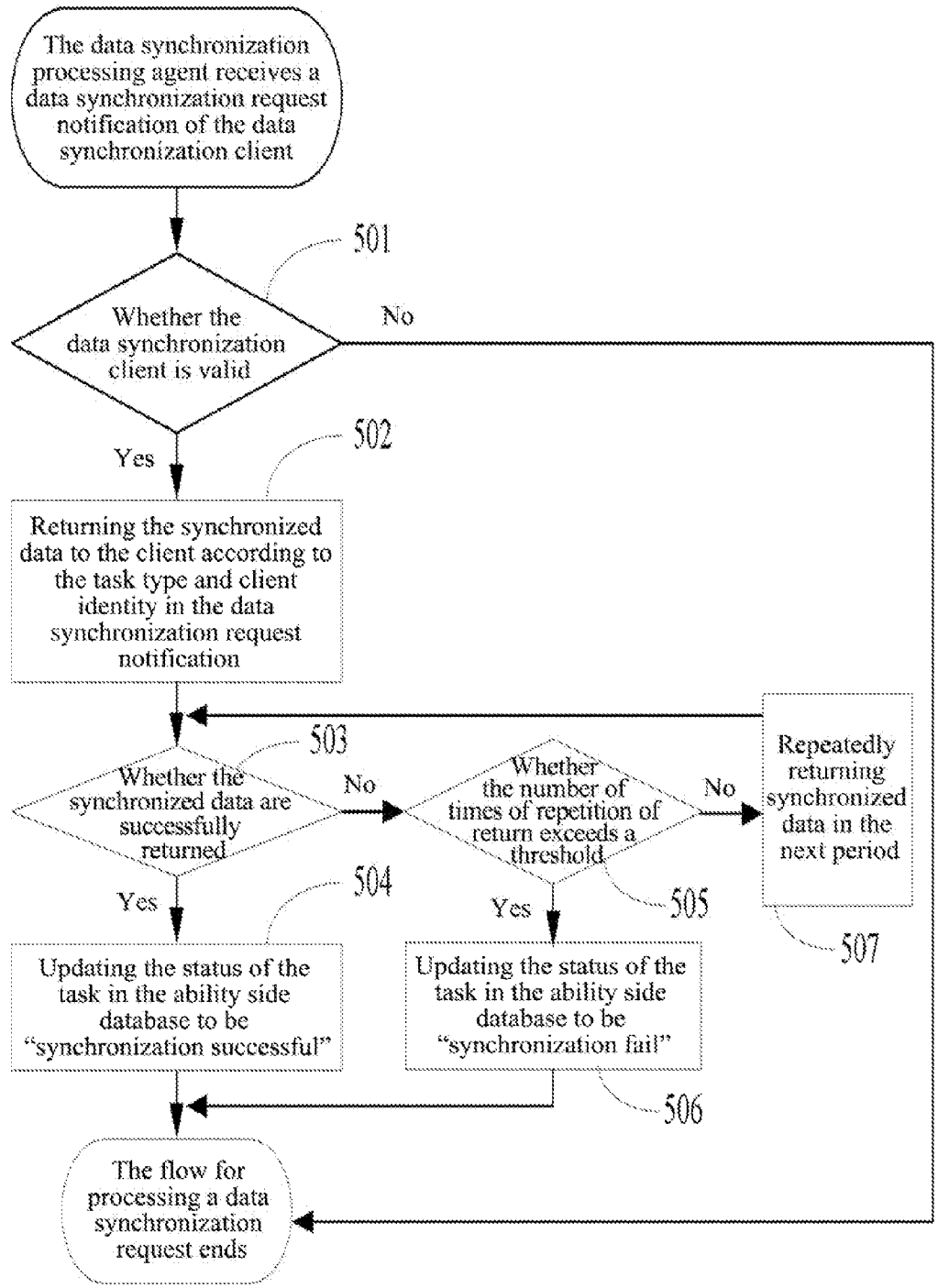
FIG. 5 is a flowchart of a data synchronization processing agent returning synchronized data according to a data synchronization request of the data synchronization client in the method example of the present invention.

FIG. 5 is a flowchart of a data synchronization processing agent returning synchronized data according to a data synchronization request of the data synchronization client in the above method example of the present invention, which is implemented after the data synchronization request notification of the data synchronization client is received by the data synchronization processing agent, and comprises the following steps:

501, checking whether the data synchronization client is valid, if yes, executing step 502, otherwise ending the flow;

502, returning the synchronized data to the data synchronization client according to the task type and client identity in the data synchronization request notification;

503, judging whether the synchronized data are successfully returned, if yes, executing step 504, otherwise executing step 505;

wherein, it is judged that the return is successful if the data synchronization processing agent receives a response of the data synchronization client after a period of time delay; if no response is received, it is judged that the return fails;

504, updating the status of the task in the ability side database to be "synchronization successful", and ending the flow;

505, judging whether the number of times of repetition of return exceeds a threshold, if yes, executing step 506, otherwise, executing step 507;

506, updating the status of the task in the ability side database to be "synchronization fail", and ending the flow;

507, repeatedly returning synchronized data in the next period, and returning to step 503.

A person having ordinary skill in the art can appreciate that all or part of the steps in the above step can be implemented by instructing related hardware through a program, which may be stored in a computer readable storage medium, such as read-only memory, disk or an optical disk, and so on. Optionally, all or part of the steps in the above examples can be also implemented using one or more integrated circuits. Correspondingly, each module/unit in the above examples can be implemented in the form of hardware, or in the form of software functional module. The present invention is not limited to any specific form of combination of hardware and software.

The above content is detailed description further made on the present invention with reference to the specific preferred embodiments. However, these examples are only used to facilitate interpretation and it shall not be construed that specific implementations of the preset invention are only limited to these descriptions. For a person having ordinary skill in the art, various possible equivalent modifications or substitutions can be made without departing from the conception of the present invention. Such modifications or substitutions, however, shall be regarded as within the protection scope of the present invention.

INDUSTRIAL APPLICABILITY

For a data synchronization system in a content delivery network of an IPTV system, the present invention reduces the excessive burden of the data synchronization processing manager in the past and balances system pressure by using a data synchronization processing agent coordinating with a data synchronization processing manager, thus improving system performance.

The present invention can be also applied to, in addition to the interactive network TV commercial system, other systems based on content delivery network like video monitoring.

What is claimed is:

1. A method for data synchronization in a content delivery network (CDN), comprising:
   a data synchronization processing manager, a plurality of data synchronization agents and a plurality of data synchronization processing clients, wherein one or more of the plurality of data synchronization clients functionally belong to one of the plurality of the data synchronization processing agents; wherein the data synchronization processing manager does not connect with any of the plurality of synchronization clients, and the synchronization processing agent does not reside on any of the plurality of synchronization clients; wherein
   a data synchronization client of the plurality of data synchronization clients requesting the data synchronization processing manager for obtaining a data synchronization processing agent of the plurality of data synchronization agents to which the data synchronization client functionally belongs and establishing a heartbeat connection with the data synchronization processing agent to acquire operation status of the data synchronization processing agent; and
   the data synchronization processing manager scanning a management side database, and when a synchronization task needing to be informed to the data synchronization client is scanned in the management side database, the data synchronization processing manager generating the synchronization task for corresponding synchronization processing agent in an ability side database.

2. The method according to claim 1, wherein the synchronization processing manager generating the synchronization task for the corresponding synchronization processing agent in an ability side database when a synchronization task needing to be informed to the data synchronization client is scanned in the management side database comprises:
   when a synchronization task needing to be informed to all data synchronization clients is scanned, generating the synchronization task for each data synchronization processing agent in the ability side database;

when a synchronization task needing to be informed to particular data synchronization clients is scanned, and a synchronization processing agent to which said particular data synchronization clients belong are queried out, generating the synchronization task for the queried data synchronization processing agent in the ability side database.

3. The method according to claim 2, wherein the synchronization task in the management side database is generated at the meantime of a management side management platform writing service data for update into the management side database when a data update is needed.

4. The method according to claim 2, wherein after generating the synchronization task for the corresponding synchronization processing agent in the ability side database, the method further comprises:

the data synchronization processing agent scanning the ability side database, and when it is scanned that there is a synchronization task needing to be executed and service data thereof for an update, locally storing the service data for the update, and meanwhile actively sending a synchronization data notification to the served data synchronization client.

5. The method according to claim 4, wherein after actively sending a synchronization data notification to the served data synchronization client, the method further comprises:

after receiving the synchronization data notification sent by the data synchronization processing agent, the data synchronization client sending a data synchronization request to the data synchronization processing agent; receiving and storing the service data for the update in this synchronization task through a data synchronization response returned by the data synchronization processing agent.

6. The method according to claim 1, wherein the synchronization task in the management side database is generated at the meantime of a management side management platform writing service data for update into the management side database when a data update is needed.

7. The method according to claim 1, wherein after generating the synchronization task for the corresponding synchronization processing agent in the ability side database, the method further comprises:

the data synchronization processing agent scanning the ability side database, and when it is scanned that there is a synchronization task needing to be executed and service data thereof for an update, locally storing the service data for the update, and meanwhile actively sending a synchronization data notification to the served data synchronization client.

8. The method according to claim 7, wherein after actively sending a synchronization data notification to the served data synchronization client, the method further comprises:

after receiving the synchronization data notification sent by the data synchronization processing agent, the data synchronization client sending a data synchronization request to the data synchronization processing agent; receiving and storing the service data for the update in this synchronization task through a data synchronization response returned by the data synchronization processing agent.

9. A system for data synchronization in a content delivery network, comprising: a management side database, a data synchronization processing manager, an ability side database, a plurality of data synchronization processing agents and a plurality of data synchronization clients, wherein one or more of the plurality of data synchronization clients functionally belong to one of the plurality of the data synchronization processing agents, the data synchronization processing manager does not connect with any of the plurality of synchronization clients, and the synchronization processing agent does not reside on any of the plurality of synchronization clients; wherein, the management side database is configured to generate and store a synchronization task and service data thereof for update;

a data synchronization client of the plurality of data synchronization clients compring a processor and a storage device, wherein the storage device stores processor-executable program, and the program is configured to request to obtain a data synchronization processing agent to which the data synchronization client functionally belongs from the data synchronization processing manager and establish a heartbeat connection with the data synchronization processing agent to acquire operation status of the data synchronization processing agent;

the data synchronization processing manager comparing a processor and a storage device, wherein the storage device stores processor-executable program, and the program is configured to distribute a data synchronization processing agent of the plurality of data synchronization agents to which a data synchronization client functionally belongs to the data synchronization client according to a request of the data synchronization client; scan the management side database, and when a synchronization task needing to be informed to the data synchronization client is scanned in the management side database, generate the synchronization task for the corresponding data synchronization processing agent in an ability side database;

the ability side database is configured to store the synchronization task and the service data thereof for update.

10. The system according to claim 9, wherein the data synchronization processing manager is configured to generate the synchronization task for the corresponding data synchronization processing agent in the ability side database in the following way:

when a synchronization task needing to be informed to all data synchronization clients is scanned in the management side database, generating the synchronization task for each data synchronization processing agent in the ability side database;

when a synchronization task needing to be informed to particular data synchronization clients is scanned in the management side database and a data synchronization processing agent to which said particular data synchronization clients belong is queried out, generating the synchronization task for the queried data synchronization processing agent in the ability side database.

11. The system according to claim 10, wherein,
the synchronization task in the management side database is generated and stored at the meantime of service data for update being written in when a management side management platform needs to update data.

12. The system according to claim 10, wherein,
the data synchronization processing agent is further configured to scan the ability side database, and when it is scanned that there is a synchronization task needing to be executed and service data thereof for update, locally store the service data for update, and meanwhile actively send a synchronization data notification to the served data synchronization client.

13. The system according to claim 12, wherein,
the data synchronization client is further configured to, after receiving the synchronization data notification sent by the data synchronization processing agent, send a data synchronization request to the data synchronization processing agent, receive and store the service data for update in this synchronization task through a data synchronization response returned by the data synchronization processing agent.

14. The system according to claim 9, wherein,
the synchronization task in the management side database is generated and stored at the meantime of service data for update being written in when a management side management platform needs to update data.

15. The system according to claim 9, wherein,
the data synchronization processing agent is further configured to scan the ability side database, and when it is scanned that there is a synchronization task needing to be executed and service data thereof for update, locally store the service data for update, and meanwhile actively send a synchronization data notification to the served data synchronization client.

16. The system according to claim 15, wherein,
the data synchronization client is further configured to, after receiving the synchronization data notification sent by the data synchronization processing agent, send a data synchronization request to the data synchronization processing agent, receive and store the service data for update in this synchronization task through a data synchronization response returned by the data synchronization processing agent.

17. A data synchronization processing manager, comprising a processor and a storage device, wherein the storage device stores processor-executable programs, and the programs comprise:
a distributing module, which is configured to receive a request for obtaining a data synchronization processing agent to which a data synchronization client functionally belongs transmitted by the data synchronization client, and distribute the data synchronization processing agent to the data synchronization client according to the request for obtaining the data synchronization processing agent, wherein the data synchronization processing manager does not connect with the synchronization client, and the synchronization processing agent does not reside on the synchronization client;
a scanning module, which is configured to scan a management side database that generates and stores a synchronization task and service data thereof for update, and when it is scanned that there is a synchronization task needing to be informed to the data synchronization client, trigger a synchronization task generating module; and
the synchronization task generating module, which is configured to, when it is scanned that there is a synchronization task needing to be informed to the data synchronization client, generate the synchronization task for the corresponding synchronization processing agent in an ability side database storing the synchronization task and service data thereof for update.

18. The data synchronization processing manager according to claim 17, wherein, the synchronization task generating module is configured to generate the synchronization task for the corresponding synchronization processing agent in the ability side database in the following way:
when a synchronization task needing to be informed to all data synchronization clients is scanned in the management side database, generating the synchronization task for each data synchronization processing agent in the ability side database;
when a synchronization task needing to be informed to particular data synchronization clients is scanned in the management side database and a synchronization processing agent to which said particular data synchronization clients belong is queried out, generating the synchronization task for the queried data synchronization processing agent in the ability side database.

* * * * *